United States Patent
Zeun et al.

(10) Patent No.: US 11,525,781 B2
(45) Date of Patent: Dec. 13, 2022

(54) METHOD FOR MEASURING OXYGEN AND APPARATUS FOR MEASURING OXYGEN

(71) Applicant: Endress+Hauser Conducta GmbH+Co. KG, Gerlingen (DE)

(72) Inventors: Hendrik Zeun, Chemnitz (DE); Ronny Michael, Erlau (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 198 days.

(21) Appl. No.: 17/106,842

(22) Filed: Nov. 30, 2020

(65) Prior Publication Data
US 2021/0164903 A1    Jun. 3, 2021

(30) Foreign Application Priority Data
Nov. 29, 2019   (DE) ..................... 10 2019 132 489.0

(51) Int. Cl.
*G01K 13/00*    (2021.01)
*G01N 21/64*    (2006.01)

(52) U.S. Cl.
CPC ......... *G01N 21/6428* (2013.01); *G01K 13/00* (2013.01); *G01N 21/6408* (2013.01);
(Continued)

(58) Field of Classification Search
CPC ........... G01K 13/00; G01N 2021/6432; G01N 21/274; G01N 21/6408; G01N 21/6428;
(Continued)

(56) References Cited

U.S. PATENT DOCUMENTS

| | | | |
|---|---|---|---|
| 9,645,089 B1* | 5/2017 | Head | G01N 33/182 |
| 2007/0140921 A1* | 6/2007 | Mitchell | B65D 85/38 |
| | | | 422/400 |

(Continued)

FOREIGN PATENT DOCUMENTS

| | | |
|---|---|---|
| AT | 407090 B1 | 12/2000 |
| AT | 512498 B1 | 9/2013 |

(Continued)

*Primary Examiner* — Mark R Gaworecki
(74) *Attorney, Agent, or Firm* — Christopher R. Powers; Endress+Hauser (USA) Holding, Inc.

(57) ABSTRACT

A measuring method for measuring dissolved oxygen includes performing a first measurement sequence, including: emitting a first stimulation signal onto a sensor for a first period; detecting a first detection signal; determining a phase shift between the first stimulation signal and the first detection signal; and calculating a first measured value based on the determined phase shift. Performing a second measurement sequence, including a second stimulation signal onto the sensor for a second period, wherein the second stimulation signal is different than the first stimulation signal; detecting a second detection signal; determining a decay time of the second detection signal; calculating a second measured value based on the decay time. The method further includes comparing the first measured value to the second measured value and correcting the first measured value when a difference between the first measured value and the second measured value is greater than a first limit value.

12 Claims, 1 Drawing Sheet

Figure 1:
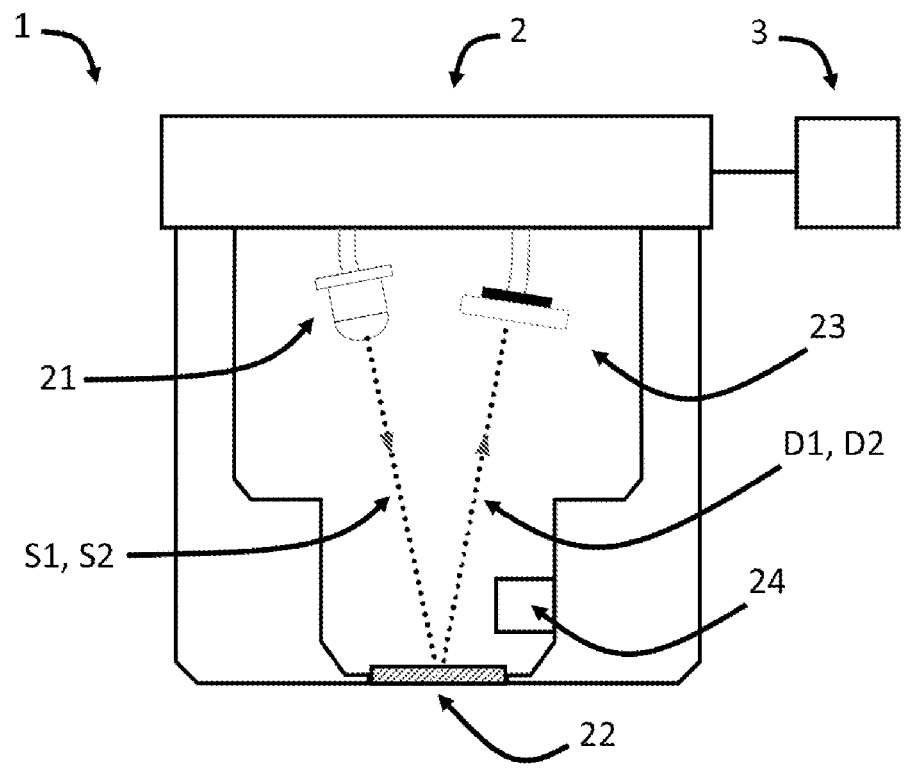

(52) U.S. Cl.
CPC ............... *G01N 2021/6432* (2013.01); *G01N 2201/062* (2013.01)

(58) Field of Classification Search
CPC ............... G01N 21/1643; G01N 21/77; G01N 2201/062; G01N 2201/1211
See application file for complete search history.

(56) References Cited

U.S. PATENT DOCUMENTS

| | | | | |
|---|---|---|---|---|
| 2007/0141695 | A1* | 6/2007 | Mitchell | G01N 21/643 |
| | | | | 435/287.2 |
| 2015/0125347 | A1* | 5/2015 | Machuca | G01N 21/643 |
| | | | | 422/82.07 |

FOREIGN PATENT DOCUMENTS

| | | | | |
|---|---|---|---|---|
| AT | 512675 | A1 | 10/2013 | |
| DE | 10058579 | A1 | 6/2002 | |
| DE | 102011121195 | B4 | 8/2013 | |
| DE | 102012104688 | A1 | 12/2013 | |
| DE | 102012111686 | A1 | 6/2014 | |
| DE | 102015015497 | A1 | 6/2017 | |
| DE | 102018129969 | A1 | 5/2020 | |
| WO | WO-2010006950 | A1 * | 1/2010 | ............. G01N 21/80 |
| WO | WO-2010009759 | A1 * | 1/2010 | ......... G01N 21/8507 |
| WO | WO-2012056072 | A1 * | 5/2012 | ........ G01N 21/6408 |
| WO | WO-2013178723 | A1 * | 12/2013 | ........ G01N 21/6428 |
| WO | WO-2014083020 | A1 * | 6/2014 | ........ G01N 21/6428 |
| WO | WO-2015143229 | A1 * | 9/2015 | ........ G01N 21/6408 |
| WO | WO-2016068689 | A1 * | 5/2016 | ........ G01N 21/6408 |
| WO | WO-2019219624 | A1 * | 11/2019 | ........... G01N 21/274 |

\* cited by examiner

METHOD FOR MEASURING OXYGEN AND APPARATUS FOR MEASURING OXYGEN

CROSS-REFERENCE TO RELATED APPLICATION

The present application is related to and claims the priority benefit of German Patent Application No. 10 2019 132 489.0, filed on Nov. 29, 2019, the entire contents of which are incorporated herein by reference.

TECHNICAL FIELD

The invention relates to a method for measuring oxygen and an apparatus for measuring oxygen.

BACKGROUND

In analytical metrology, especially in the fields of water management, environmental analysis, and in industry, for example in food technology, biotechnology and pharmaceuticals, as well as for various laboratory applications, measured variables such as pH value, conductivity, or the concentration of analytes such as ions or dissolved gases in a gaseous or liquid measurement medium are of great importance. These measured variables may be detected and/or monitored, for example by means of electrochemical sensors such as potentiometric, amperometric, voltammetric, coulometric, or optical sensors, or else conductivity sensors.

Optical sensors are used most often in the field of dissolved oxygen measurement. It is hereby important that the dissolved oxygen content is measured as accurately as possible and as quickly as possible, i.e. that a change in the oxygen content is measured optimally without delay.

Any measuring principle for measuring dissolved oxygen is based on measuring a phase difference between a stimulation signal and an oxygen-dependent response signal of a fluorescent spot stimulated by the stimulation signal.

However, this measuring principle has the disadvantage that, given a strong phase shift, i.e. a phase shift greater than $2\pi$ or 360°, there is a risk of confusing it with a weak phase shift, which results in an incorrect measurement of the dissolved oxygen.

SUMMARY

It is therefore an object of the invention to provide a measuring method which enables an accurate and rapid measurement of dissolved oxygen.

This object is achieved according to the invention by a measuring method according to claim 1.

The measuring method according to the invention for measuring dissolved oxygen includes at least the following steps:
  providing an apparatus for measuring dissolved oxygen with an optical sensor of a computing unit which is connected to said optical sensor, wherein the optical sensor has a light source, a sensitive layer, and a detector,
  performing a first measurement sequence at least once, wherein the first measurement sequence includes the following steps:
  the light source emitting a first stimulation signal onto the sensitive layer for a first period of time,
  the detector detecting a first detection signal emitted by the sensitive layer,
  determining a phase shift between the first stimulation signal and the first detection signal,
  calculating a first measured value based on the determined phase shift,
  performing a second measurement sequence at least once, wherein the second measurement sequence includes the following steps:
  the light source emitting a second stimulation signal onto the sensitive layer for a second time period, wherein the second stimulation signal is different than the first stimulation signal,
  the detector detecting a second detection signal emitted by the sensitive layer,
  determining a decay time of the second detection signal,
  calculating a second measured value based on the decay time,
  comparing the first measured value determined by the first measurement sequence to the second measured value determined by the second measurement sequence,
  correcting the first measured value if a difference between the first measured value and the second measured value is greater than a first limit value.

Using the measuring method according to the invention, it is made possible that the measurement of dissolved oxygen takes place more accurately, with greater certainty, and more reliably. The quality of the measured value is thus increased.

According to one embodiment of the invention, the correction of the first measured value includes calculating the corrected first measured value based on a corrected phase shift. The corrected phase shift corresponds to a phase shift shifted by 360° as compared to the measured phase shift.

According to one embodiment of the invention, the first measurement sequence and the second measurement sequence are performed multiple times. The second measurement sequence is performed more often than the first measurement sequence if the first measured value and/or the second measured value exceed a second limit value.

According to one embodiment of the invention, the second limit value is a predetermined partial pressure value, for example, a partial pressure value of 500 hPa.

According to one embodiment of the invention, the apparatus comprises a temperature sensor which is connected to the computing unit. The method includes a step of determining a temperature of the measurement medium. The second limit value is a predetermined temperature value; the temperature value is, for example, 50° C.

According to one embodiment of the invention, the first measurement sequence and the second measurement sequence are performed multiple times. The first measurement sequence is performed more often than the second measurement sequence if the first measured value and/or the second measured value fall below a third limit value.

According to one embodiment of the invention, the third limit value is a predetermined oxygen-related limit value, for example a partial pressure value of 100 hPa, for example.

According to one embodiment of the invention, the first measurement sequence includes a step of filtering the first detection signal prior to the step of determining a phase shift. The filtering comprises a lock-in filtering.

This object according to the invention is furthermore achieved by an apparatus according to claim 9.

The apparatus according to the invention is suitable for measuring dissolved oxygen and comprises an optical sensor and a computing unit. The computing unit is connected to the optical sensor. The optical sensor has a light source, a sensitive layer, and a detector. The apparatus is suitable for executing the measuring method according to any of the preceding claims.

According to one embodiment of the invention, the optical sensor has a temperature sensor and is connected to the computing unit. The temperature sensor is suitable for determining a temperature of the measurement medium.

Figure 2:
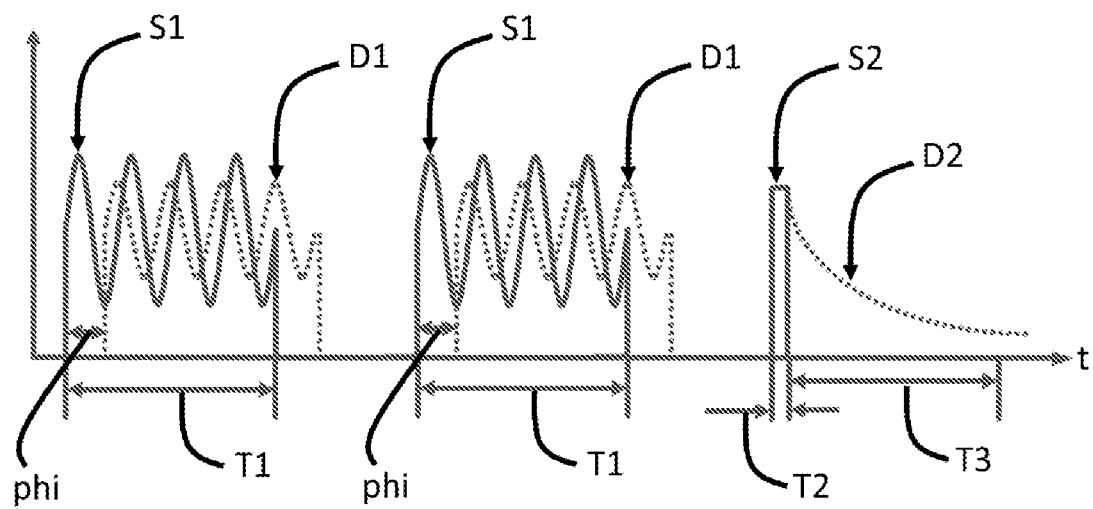

The invention will be explained in more detail on the basis of the following Figure description. The following are shown:

FIG. 1 shows a schematic representation of a measuring apparatus for measuring dissolved oxygen; and FIG. 2 shows an exemplary schematic representation of a course of stimulation signals and detection signals for determining the phase shift and the decay time.

DETAILED DESCRIPTION

FIG. 1 shows an exemplary embodiment of an apparatus 1 for measuring dissolved oxygen. The apparatus 1 has an optical sensor 2 and a computing unit 3. The optical sensor 2 is connected to the computing unit 3. In an alternative embodiment, not shown, the computing unit 3 is integrated in the optical sensor 2.

The optical sensor 2 comprises a light source 21, a sensitive layer 22, and a detector 23. In the embodiment shown in FIG. 1, the optical sensor 2 additionally has a temperature sensor 24.

The light source 21 is an LED, for example. The light source 21 is suitable for emitting a stimulation signal S1, S2, for example in the form of a light signal, in such a way that this stimulation signal S1, S2 impinges on the sensitive layer 22. The stimulation signal S1, S2 is illustrated in FIG. 1 by the dashed line between the light source 21 and the sensitive layer 22. The stimulation signal S1, S2 is intended to stimulate the sensitive layer 22. The stimulation signal S1, S2 has a frequency of between 500 Hz and 10 kHz, for example, 4 kHz.

The sensitive layer 22 is sensitive to certain analytes. This means that the sensitive layer 22 changes its physical and/or chemical properties when the sensitive layer 22 comes into contact with certain analytes. The sensitive layer 22 has fluorophores. If the sensitive layer 22 is exposed with light, the sensitive layer 22 emits a detection signal D1, D2. The detection signal D1, D2 is illustrated in FIG. 1 by the dashed line between the sensitive layer 22 and the detector 23. The detection signal D1, D2 is intended to be detected by the detector 23. The detection signal D1, D2 has a wavelength of between 500 nm and 900 nm, for example, 700 nm.

The detector 23 is arranged in the optical sensor 2 in such a way that the detector 23 is suitable for detecting the detection signal D1, D2 emitted by the sensitive layer 22. For signal filtering, another optical filter can be installed in front of the detector 23 or be integrated into the detector 23. Thus, it is possible to detect only the stimulation signal S1, S2 having a certain wavelength. Any parasitic light penetrating into the sensor 2 from the outside may thus be filtered.

The temperature sensor 24 is connected to the computing unit 3. In FIG. 1, the temperature sensor 24 is arranged inside the optical sensor 2. However, in an alternative embodiment (not shown) the temperature sensor 24 may also be arranged in such a way that it is suitable for coming into direct contact with the measurement medium.

The measuring method for measuring dissolved oxygen is described in the following:

In a first step, the apparatus 1 described above is provided. This means that the apparatus 1 is ready to measure the dissolved oxygen in a measurement medium. For example, it may be measured in air or in water.

In a next step, a first measurement sequence is performed at least once.

The first measurement sequence includes the light source 21 emitting a first stimulation signal S1. The first stimulation signal S1 is emitted such that the sensitive layer 22 is stimulated by the first stimulation signal S1. The first stimulation signal S1 is emitted by the light source 21 for a first time period T1. For example, the first time period T1 is more than 2 ms. The stimulation signal S1 may also be a continuous signal. For example, the first stimulation signal S1 has a frequency of 4 kHz. In one embodiment, the stimulation signal S1 has a wavelength of between 600 nm and 700 nm.

Due to the stimulation by the first stimulation signal S1, the sensitive layer 22 emits a first detection signal D1. This first detection signal D1 is dependent on the oxygen dissolved in the measurement medium. The first detection signal D1 becomes weaker given a high oxygen content in the measurement medium, and thus also in the sensitive layer 22. This process is also called quenching.

The first measurement sequence then includes the detector 23 detecting the first detection signal D1 emitted by the sensitive layer 22.

Optionally, the first measurement sequence includes a step of filtering the first detection signal D1. The first detection signal D1 is filtered by a lock-in filtering, for example.

The first measurement sequence then includes the determination of a phase shift phi between the first stimulation signal S1 and the first detection signal D1.

The first measurement sequence next includes a step of calculating a first measured value based on the determined phase shift phi. The first measured value represents an oxygen-related parameter. For example, the first measured value is a partial pressure value.

The measuring method furthermore includes performing a second measurement sequence, which is performed at least once.

The second measurement sequence includes the light source 21 emitting a second stimulation signal S2. The second stimulation signal S2 is emitted such that the sensitive layer 22 is stimulated by the second stimulation signal S2. The second stimulation signal S2 is emitted by the light source 21 for a second time period T2. For example, the second time period T2 is less than 10 ms, for example, between 1 and 100 ms. The second stimulation signal S2 is different than the first stimulation signal S1. For example, the second stimulation signal S2 is a pulse signal.

Due to stimulation by the second stimulation signal S2, the sensitive layer 22 emits a second detection signal D2. This second detection signal D2 depends on the oxygen dissolved in the measurement medium. The second detection signal D2 becomes weaker given a high oxygen content in the measurement medium, and thus also in the sensitive layer 22. In other words, the "afterglow" of the sensitive layer 22 is evaluated. A specific intensity value, also called tau, is determined using the falling curve of the second detection signal D2.

The second measurement sequence then includes the detector 23 detecting the second detection signal D2 emitted by the sensitive layer 22.

The second measurement sequence furthermore includes a step of determining a decay time T3 of the second detection signal D2. The decay time is determined from the signal curve of the second detection signal D2. For example, the slope of the second detection signal D2 is used to determine the decay time T3. The decay time T3 is calculated, for example from the point in time at which the second stimulation signal S2 was switched off until the time at which the slope of the second detection signal D2 is less than 50%, for example, equal to 33%.

The second measurement sequence furthermore includes a step of calculating a second measured value based on the decay time. The shorter the decay time becomes, the more oxygen is dissolved in the measurement medium.

An advantage of the second measurement sequence is that only a very short pulse is sufficient for stimulation of the sensitive layer 22, whereby the lifetime of the sensitive layer 22 is less negatively affected, and at the same time a low energy needs to be applied in order to emit the first stimulation signal S1 during a short pulse.

In a further step of the measuring method, the first measured value determined via the first measurement sequence is compared to the second measured value determined via the second measurement sequence. This comparison takes place in the computing unit 3.

In a next step of the measuring method, the first measured value is corrected if a difference between the first measured value and the second measured value is greater than a first limit value. The first limit value is thus a maximum permitted difference between the first measured value and the second measured value. For example, the maximum permitted difference, i.e. the first limit value, is 10% of the greater of the two measured values.

The step of correcting the first measured value includes calculating a corrected first measured value based on a corrected phase shift. The corrected phase shift is a phase shift which is shifted by 360° compared to the measured phase shift phi.

In the correction, the measured phase shift phi is first shifted by +360°. A corrected first measured value is then calculated which is compared to the second measured value. If, after this comparison, the difference between the two measured values is still greater than in the event of the uncorrected measured values or phase shifts, the correction of the measured phase shift phi is performed again, but with −360°. After this correction, a smaller difference than the difference between the uncorrected measured values is to be expected if the corrected first measured value is re-calculated and the measured values are compared again.

The first measurement sequence and the second measurement sequence are performed multiple times.

The second measurement sequence is performed more often than the first measurement sequence if the first measured value and/or the second measured value exceed a second limit value. The second limit value is a predetermined oxygen-related limit value. For example, the second limit value is an oxygen concentration value, a partial pressure value, or a saturation value. The second limit value is, for example, a partial pressure value of 500 hPa.

The first measurement sequence is performed more often than the second measurement sequence if the first measured value and/or the second measured value fall below a third limit value. The third limit value is a predetermined oxygen-related limit value. For example, the third limit value is an oxygen concentration value, a partial pressure value, or a saturation value. The third limit value is, for example, a partial pressure value of 100 hPa. Oxygen concentration values or saturation values may also be determined based on the partial pressure value, taking into account the temperature prevailing in the medium.

Optionally, the measuring method comprises a step of the temperature sensor 24 determining a temperature of the measurement medium. In this instance, the second measurement sequence is performed more often than the first measurement sequence if a predetermined temperature value is exceeded and/or if the predetermined oxygen-related limit value is exceeded. The temperature-related limit value is 50° C., for example.

If neither the second limit value nor the third limit value is exceeded or underrun, both measurement sequences are executed identically often, for example alternately. It should be noted that typically the two measured values which are determined by the two different measurement sequences have comparable values in a normal measuring range with a partial pressure of 50 hPa to 300 hPa.

It is also possible, if neither the second limit value nor the third limit value is exceeded or underrun, to give priority to a measurement sequence, for example in order to save energy. In this instance, for example, the second measurement sequence may be executed twice as often as the first measurement sequence.

The optical sensor 2 is designed such that, in the second measurement sequence, the light source 21 may be deactivated very quickly and the detector 23 may detect the decaying second detection signal D2 promptly at the switch-off time of the second stimulation signal S2. For example, a fast analog-to-digital converter is used.

If one of the three limit values is exceeded or underrun, a warning signal may be output to a user via an output unit (not shown).

A voltage-controlled current source is, for example, used as driver for the light source 21. Both a light pulse for the second stimulation signal S2 of the second measurement sequence and a sinusoidal signal for the first stimulation signal S1 of the first measurement sequence can be generated with this.

In addition, all capacitances in the detector 23 are, for example, selected to be small enough that a required bandwidth for filtering the second detection signal D2 is possible.

A time constant of the filters (RC element) in the optical sensor 2 must be much smaller than the decay time so that fast decay curves are not affected.

In an embodiment that is not shown, the optical sensor 2 has two separate measuring channels to increase the measurement reliability. This means that two light sources 21 and two detectors 23 are arranged in the optical sensor 2. It is thus possible to execute the measuring method in parallel.

The temperature sensor may be used for compensating the temperature in the detection signal D1, D2.

In one embodiment, a weighting of the first measured value and of the second measured value is used for a calculation of a total measured value. However, the total measured value is calculated only if the first measured value and the second measured value are close to one another.

The method described above is also suitable for measuring other parameters for liquid analysis than dissolved oxygen, provided that the first measurement sequence and the second measurement sequence make it possible to measure these parameters.

The invention claimed is:
1. A method for measuring dissolved oxygen in a medium, the method comprising:
providing an apparatus configured to measure dissolved oxygen, the apparatus comprising a computing unit connected to an optical sensor, the optical sensor including a light source, a sensitive layer and a detector;

performing a first measurement sequence at least once, wherein the first measurement sequence comprises:
  emitting a first stimulation signal from the light source onto the sensitive layer for a first time period;
  detecting a first detection signal emitted by the sensitive layer using the detector;
  determining a phase shift between the first stimulation signal and the first detection signal; and
  calculating a first measured value based on the determined phase shift;

performing a second measurement sequence at least once, wherein the second measurement sequence comprises:
  emitting a second stimulation signal from the light source onto the sensitive layer for a second time period, wherein the second stimulation signal is different than the first stimulation signal;
  detecting a second detection signal emitted by the sensitive layer using the detector;
  determining a decay time of the second detection signal; and
  calculating a second measured value based on the decay time;

comparing the first measured value determined by the first measurement sequence to the second measured value determined by the second measurement sequence; and correcting the first measured value when a difference between the first measured value and the second measured value is greater than a first limit value.

2. The method of claim 1, wherein correcting the first measured value includes calculating the corrected first measured value based on a corrected phase shift, wherein the corrected phase shift corresponds to a phase shift which is shifted by 360° relative to the determined phase shift.

3. The method of claim 1, wherein the first measurement sequence and the second measurement sequence are performed multiple times, wherein the second measurement sequence is performed more often than the first measurement sequence when the first measured value and/or the second measured value exceed a second limit value.

4. The method of claim 3, wherein the second limit value is a predetermined oxygen-related limit value.

5. The method of claim 4, wherein the predetermined oxygen-related limit value is a partial pressure value.

6. The method of claim 3, wherein the apparatus comprises a temperature sensor connected to the computing unit, the method further comprising determining a temperature of the medium, wherein the second limit value is a predetermined temperature value.

7. The method of claim 1, wherein the first measurement sequence and the second measurement sequence are performed multiple times, wherein the first measurement sequence is performed more frequently than the second measurement sequence when the first measured value and/or the second measured value are below a third limit value.

8. The method of claim 7, wherein the third limit value is a predetermined oxygen-related limit value.

9. The method of claim 8, wherein the predetermined oxygen-related limit value is a partial pressure value.

10. The method of claim 1, wherein the first measurement sequence comprises filtering the first detection signal before determining a phase shift, wherein the filtering comprises a lock-in filtering.

11. An apparatus for measuring dissolved oxygen in a medium, the apparatus comprising:
  an optical sensor connected a computing unit, wherein the optical sensor includes a light source, a sensitive layer and a detector, wherein the apparatus is configured to execute the method of claim 1.

12. The apparatus of claim 11, wherein the optical sensor includes a temperature sensor connected to the computing unit, wherein the temperature sensor is configured to determine a temperature of the medium.

* * * * *